(12) United States Patent
Walters et al.

(10) Patent No.: US 11,182,802 B1
(45) Date of Patent: Nov. 23, 2021

(54) FRAUD MITIGATION VIA WIRELESS COMMUNICATION OF DYNAMIC TRANSACTION CARDS

(71) Applicant: Capital One Services, LLC, McLean, VA (US)

(72) Inventors: Austin Walters, Savoy, IL (US); Vincent Pham, Champaign, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/877,969

(22) Filed: May 19, 2020

(51) Int. Cl.
| | | |
|---|---|---|
| *G06Q 30/00* | (2012.01) | |
| *H04W 12/12* | (2021.01) | |
| *G06Q 20/20* | (2012.01) | |
| *G06Q 20/40* | (2012.01) | |
| *G06Q 20/42* | (2012.01) | |
| *G06Q 20/34* | (2012.01) | |
| *H04W 4/80* | (2018.01) | |
| *H04W 84/12* | (2009.01) | |

(52) U.S. Cl.
CPC ....... *G06Q 30/0185* (2013.01); *G06Q 20/204* (2013.01); *G06Q 20/341* (2013.01); *G06Q 20/352* (2013.01); *G06Q 20/354* (2013.01); *G06Q 20/40* (2013.01); *G06Q 20/42* (2013.01); *H04W 4/80* (2018.02); *H04W 12/12* (2013.01); *H04W 84/12* (2013.01)

(58) Field of Classification Search
CPC ............. G06Q 30/0185; G06Q 20/204; G06Q 20/341; G06Q 20/40; H04W 4/80
See application file for complete search history.

(56) References Cited

U.S. PATENT DOCUMENTS

| | | | |
|---|---|---|---|
| 9,202,212 B1 | 12/2015 | Candelore et al. | |
| 9,805,370 B1* | 10/2017 | Quigley | H04L 63/0428 |
| 9,911,116 B1 | 3/2018 | Lewis et al. | |
| 10,504,093 B1 | 12/2019 | Lewis et al. | |
| 2013/0189953 A1* | 7/2013 | Mathews | H04L 12/28 455/411 |
| 2013/0346311 A1* | 12/2013 | Boding | G06Q 20/4016 705/44 |
| 2016/0007270 A1* | 1/2016 | Maor | G01B 7/003 455/434 |
| 2016/0189143 A1* | 6/2016 | Koeppel | G06Q 20/3224 705/41 |

* cited by examiner

*Primary Examiner* — A. Hunter Wilder
(74) *Attorney, Agent, or Firm* — Banner & Witcoff, Ltd.

(57) ABSTRACT

Systems and methods disclosed herein provide fraud mitigation via dynamic transaction card wireless communication. A mobile device may cause a dynamic transaction card to periodically scan its environment to detect wireless enabled devices proximately located near the dynamic transaction card. Based on identifying the wireless enabled devices frequently located near the dynamic transaction card, a set of approved devices may be determined. During a transaction, a dynamic transaction card may scan its environment for other wireless enabled devices proximately located near the dynamic transaction card. If wireless enabled devices detected by the dynamic transaction card are all, or a subset, of the devices that are frequently located near the card, then the transaction may be authorized. However, if the wireless enabled devices detected by the dynamic transaction card are not all, or a subset, of the devices that are frequently located near the card, then the transaction may be unauthorized.

14 Claims, 5 Drawing Sheets

FRAUD MITIGATION VIA WIRELESS COMMUNICATION OF DYNAMIC TRANSACTION CARDS

FIELD OF USE

Aspects described herein generally relate to dynamic transaction card communication, and hardware and software related thereto. More specifically, one or more aspects describe herein mitigate fraud via dynamic transaction card wireless communication.

Short range wireless protocols, such as near field communication (NFC), WiFi, WiFi Direct, Bluetooth®, Bluetooth® Low Energy (BLE), RFID, or any equivalent thereof, allow communication between wireless enabled devices separated by relatively short distances. Wireless enabled devices include a built-in radio antenna (transmitters and receivers) that may simultaneously send and receive wireless signals from other devices.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems and methods disclosed herein provide fraud mitigation via wireless communications between smart cards or dynamic transaction cards. A wireless enabled device, such as a dynamic transaction card, may communicate with other wireless enabled devices in its environment via connectionless broadcasting or an established connection. For example, using connectionless broadcasting, a wireless enabled device may send or broadcast data to any other wireless enabled device within listening range. A wireless enabled listening device may, based on detecting the broadcast data, initiate a connection with the wireless enabled broadcasting device. A connection established between any two wireless enabled devices allows two-way communication between them.

Any wireless communication protocol, may be utilized to enable dynamic transaction cards to communicate with each other. The wireless communication protocol may be a reduced power communication protocol, similar to Bluetooth Low Energy (BLE) or any other suitable reduced power (e.g., ~5 ma/transmission) communications protocol (e.g., BLE, NFC), to reduce the power required by the smart/transaction card. A dynamic transaction card may periodically scan its environment and detect signals broadcast by other dynamic transaction cards and wireless enabled devices in physical proximity to the dynamic transaction card. Information about wireless enabled cards and devices broadcasting the signals may be identified and recorded over a period of time. When a dynamic transaction card is used as payment to conduct an attempted financial transaction via a point-of-sale (POS) terminal, the POS terminal may cause the dynamic transaction card to scan its environment and detect signals broadcast by other wireless enabled dynamic transaction cards and devices in proximity to the dynamic transaction card. If the cards and devices detected nearby during the attempted financial transaction comprise a subset of the cards and devices that have been detected nearby over a period of time, then the attempted transaction is authorized.

The method and systems described herein provide increased fraud mitigation for dynamic transaction cards by ensuring that the cards and devices normally present nearby or in physical proximity to a dynamic transaction card are also present nearby or in physical proximity to the card when the card is used to conduct a financial transaction.

According to one aspect, the disclosure relates to a computer-implemented method that includes receiving, by a server and at regular time intervals, data associated with a first plurality of signals detected by a dynamic transaction card. The first plurality of signals are broadcast by one or more first devices in physical proximity to the dynamic transaction card. The method also includes determining, by the server and based on the received data associated with the first plurality of signals, one or more of the first devices that are expected to be detected by the dynamic transaction card while attempting an authorized financial transaction via a point-of-sale (POS) terminal. The method further includes receiving, by the server, data associated with a second plurality of signals detected by the dynamic transaction card in association with an attempted financial transaction conducted via a point-of-sale (POS) terminal, wherein the second plurality of signals are broadcast by one or more second devices in physical proximity to the dynamic transaction card during the attempted financial transaction. The method includes determining, by the server and based on the received data associated with the second plurality of signals, whether the one or more second devices comprise a subset of the one or more of the first devices that are expected to be detected by the dynamic transaction card while attempting an authorized financial transaction via a point-of-sale (POS) terminal. The method includes generating, by the server and based on determining that the one or more second devices do not comprise a subset of the one or more of the first devices that are expected to be detected by the dynamic transaction card while attempting an authorized financial transaction, an indication that the attempted financial transaction is unauthorized. The method also includes sending, by the server and to the POS terminal, an indication that the attempted financial transaction is unauthorized.

According to another aspect, the disclosure relates to an apparatus that includes one or more processors, and a memory storing computer-readable instructions. The computer-readable instructions, when executed by the one or more processors, cause the apparatus to receive, periodically, data associated with a first plurality of signals detected by a dynamic transaction card. The first plurality of signals is broadcast by one or more first devices in physical proximity to the dynamic transaction card. The instructions also cause the apparatus to determine, based on the received data associated with the first plurality of signals, one or more devices anticipated to be detected by the dynamic transaction card in physical proximity to the dynamic transaction card at an authorized financial transaction. The instructions also cause the apparatus to receive, data associated with a second plurality of signals detected by the dynamic transaction card. The second plurality of signals are broadcast by one or more second devices in physical proximity to the dynamic transaction card during an attempted financial transaction conducted via a point-of-sale (POS) terminal. The instructions also cause the apparatus to determine, based on the received data associated with the second plurality of signals, whether the one or more second devices comprise a subset of the one or more devices anticipated to be detected by the dynamic transaction card in physical proximity to the dynamic transaction card during an authorized financial transaction. The instructions also cause the apparatus to generate, based on determining that the one or more second devices do not comprise a subset of the one or more devices anticipated to be detected by the dynamic transaction card in physical proximity to the dynamic transaction card during an authorized financial transaction, an indication that the attempted financial transaction is unauthorized. The instructions also cause the apparatus to send, for delivery to the POS terminal, the indication that the attempted financial transaction is unauthorized.

According to another aspect, the disclosure relates to non-transitory machine-readable medium storing instructions that, when executed by one or more processors, cause the one or more processors to perform steps comprising receiving, periodically, data associated with a first plurality of signals detected by a dynamic transaction card. The first plurality of signals is broadcast by one or more first devices in physical proximity to the dynamic transaction card. The one or more first devices comprise at least one of a dynamic transaction card or a mobile device associated with an owner of the dynamic transaction card. The dynamic transaction card comprises a short-range wireless communication-enabled card, and the wireless communication comprises a short-range wireless communication protocol. The steps also comprise determining, based on the received data associated with the first plurality of signals, one or more approved devices expected to be detected by the dynamic transaction card in physical proximity to the dynamic transaction card when conducting an authorized financial transaction. The steps comprise receiving, data associated with a second plurality of signals detected by the dynamic transaction card. The second plurality of signals are broadcast by one or more second devices in physical proximity to the dynamic transaction card during an attempted financial transaction conducted via a point-of-sale (POS) terminal. The steps comprise determining, based on the received data associated with the second plurality of signals, whether the one or more second devices comprise a subset of the one or more approved devices. The steps comprise generating, based on determining that the one or more second devices do not comprise a subset of the one or more approved devices, an indication that the attempted financial transaction is unauthorized. The attempted financial transaction is blocked based on a determination that the attempted financial transaction is unauthorized. The steps comprise locking the dynamic transaction card, based on determining that the attempted financial transaction is unauthorized, to prevent a future use of the dynamic transaction card. The steps comprise notifying the owner of the dynamic transaction card that the attempted financial transaction is unauthorized. The steps comprise ending, for delivery to the POS terminal, the indication that the attempted financial transaction is unauthorized.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Figure 1:
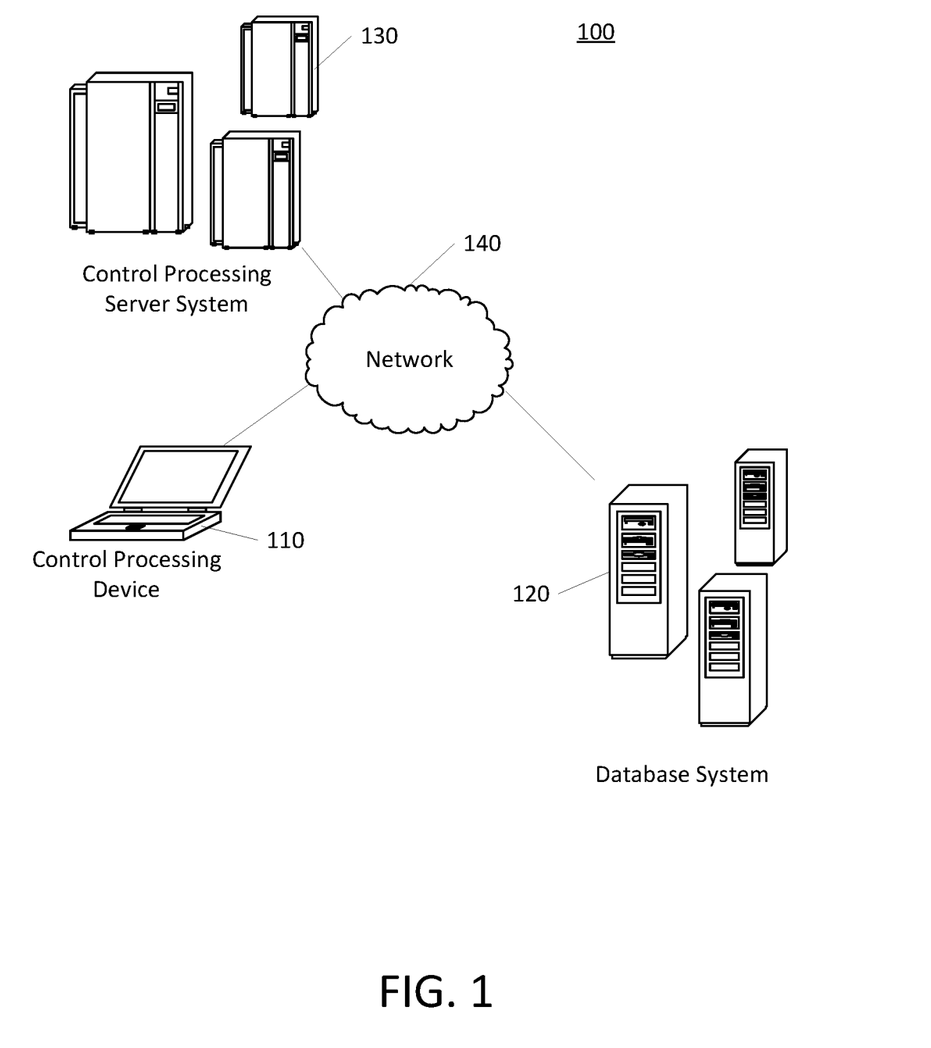
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
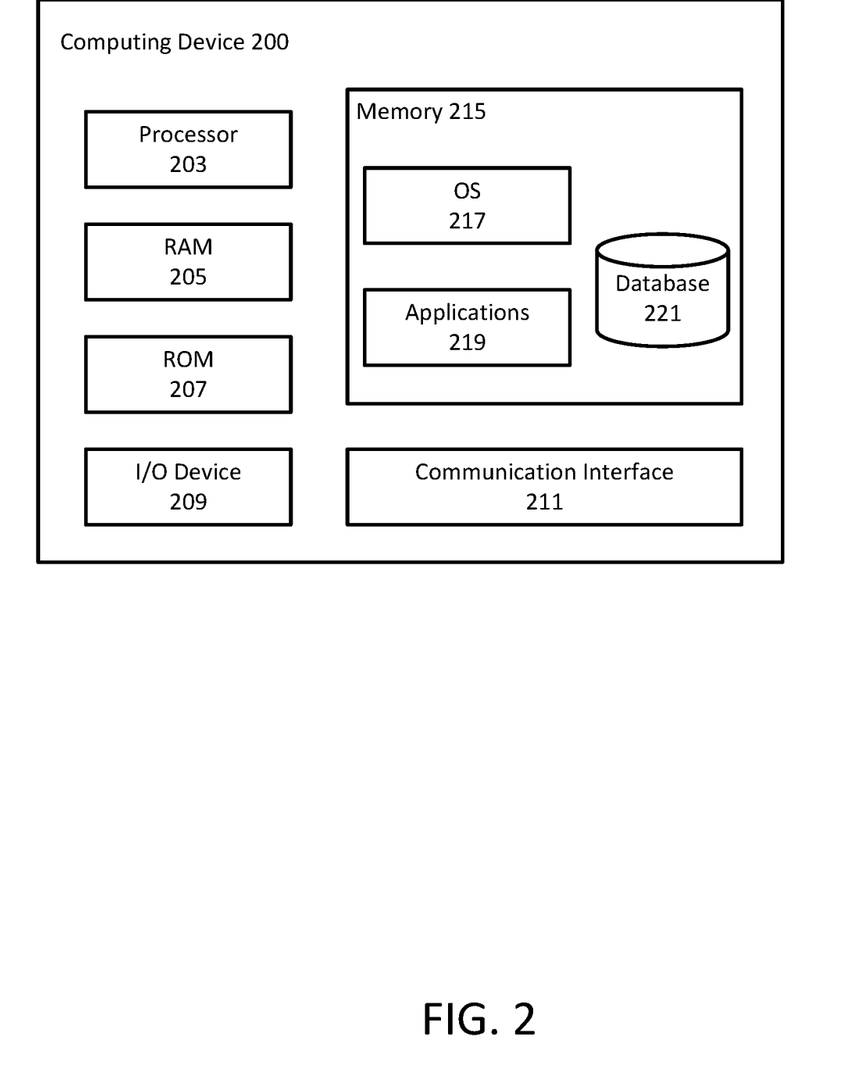
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device. Additionally or alternatively, computing device 200 may represent, be incorporated in, and/or include various devices such as a terminal, a point-of-sale terminal, a card reader, an EMV reader, a cash register, a mobile payment device, and/or any other type of data processing device capable of transacting with a dynamic transaction card.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3A:
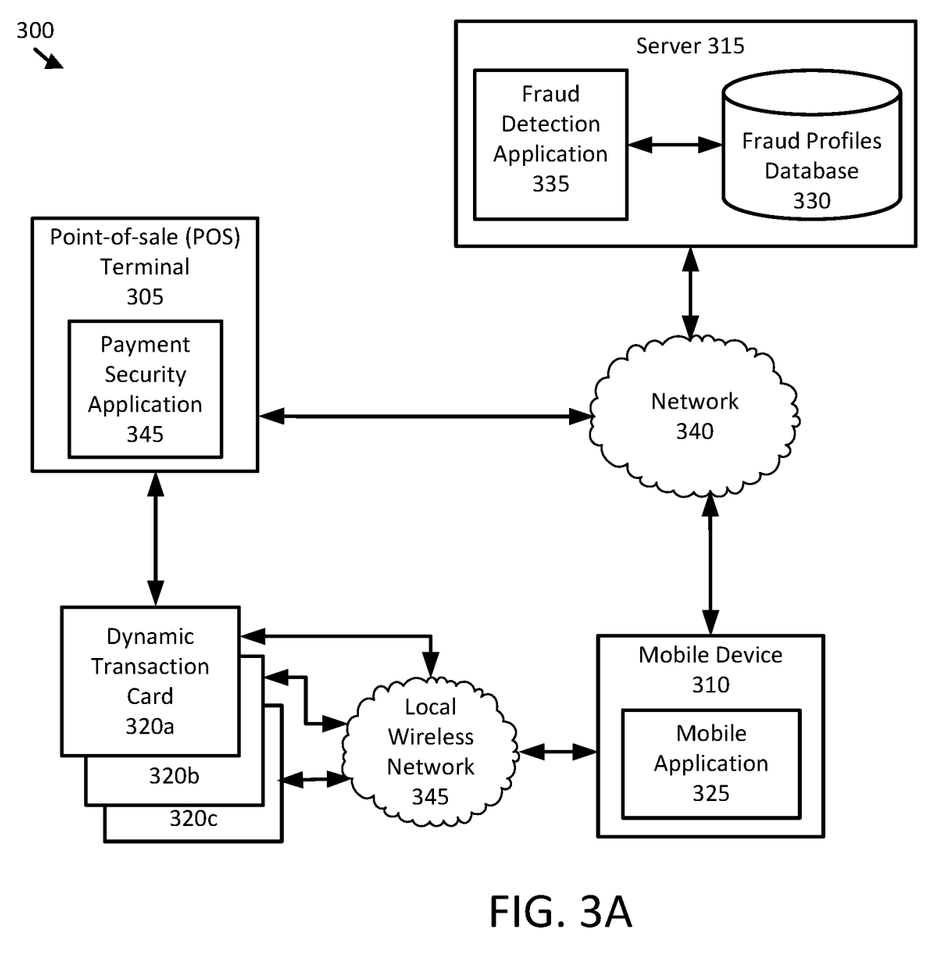
FIG. 3A shows an example system for mitigating fraud via dynamic transaction card local wireless communication.
Figure 3B:
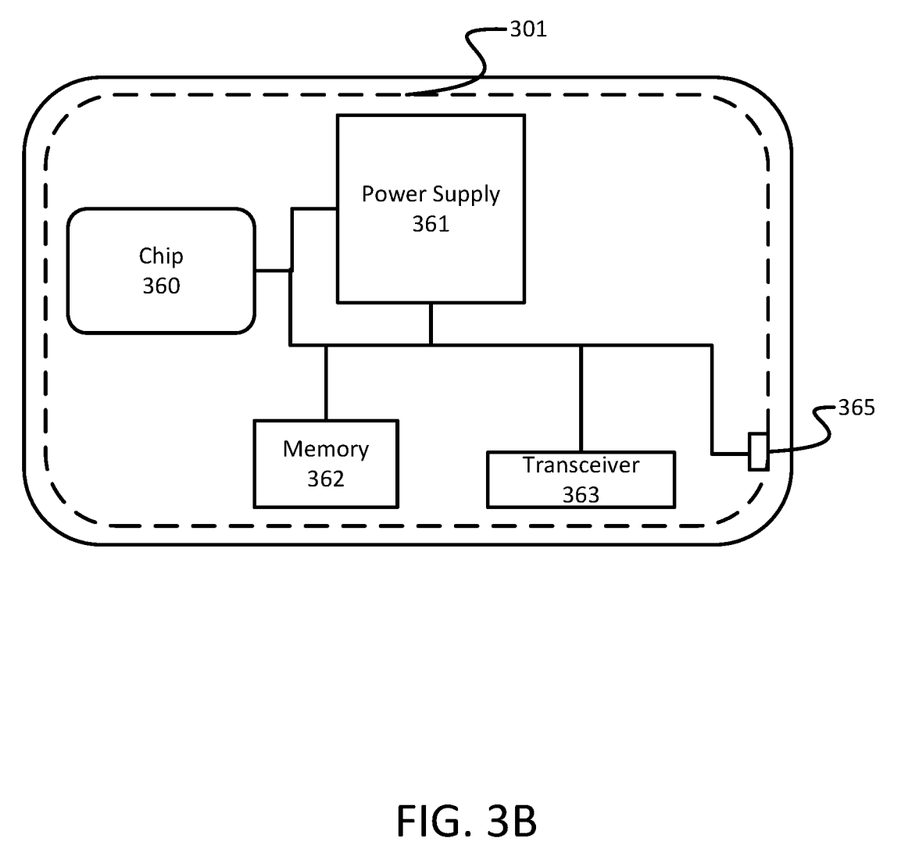
FIG. 3B shows an example dynamic transaction card.

FIG. 3A shows an example system 300 for mitigating fraud via wireless communication of dynamic transaction cards. The system 300 includes a point-of-sale (POS) terminal 305, a mobile device 310, a server 315, and three dynamic transaction cards 320a-c (generally referred to as dynamic transaction cards 320). FIG. 3B shows is an example of a dynamic transaction card 301 and is discussed in greater detail below. The dynamic transaction cards 320 and the mobile device 310 may be Bluetooth Low Energy (BLE)-enabled and/or wireless communication-enabled devices. The wireless communication may be conducted via a local wireless network 345 or personal area network (PAN) and comprise a short-range wireless communication protocol. The dynamic transaction cards 320 and/or the mobile device 310 may belong to a card holder. The dynamic transaction cards 320 may be associated with respective financial accounts associated with the card holder.

A memory of the mobile device 310 may store one or more applications, such as a mobile application 325. The mobile application 325 may cause the mobile device 310 to initiate and establish a connection with the first dynamic transaction card 320a. Based on the established connection, the mobile application 325 may cause the first dynamic transaction card 320a to scan its environment and detect signals that are being broadcast by one or more wireless communication-enabled cards and/or devices in proximately located to the first dynamic transaction card 320a, such as the second dynamic transaction card 320b, third dynamic transaction card 320c, and/or the mobile device 310. The second and third dynamic transaction cards 320b and 320c may not always be broadcasting signals. In some cases, the second and third dynamic transaction cards 320b and 320c may need to be jostled and/or charged in order for them to "wake up." The mobile application 325 may cause the first dynamic transaction card 320a to scan its environment periodically at regular time intervals, for example, weekly, daily, or at other pre-scheduled times. The signals broadcast by the second and third dynamic transaction cards 320b and 320c and/or the mobile device 310 may include a unique device identifier of the card 320 and/or mobile device 310 broadcasting the signals.

The mobile application 325 may cause the first dynamic transaction card 320a to send data associated with the signals detected by the first dynamic transaction card 320a to the mobile device 310. The mobile application 325 may receive the data from the first dynamic transaction card 320a and process the received data. For example, the mobile application 325 may remove data associated with signals that were broadcast by cards and/or devices not associated with the card holder and/or owner of the first dynamic transaction card 320a. The reason for doing so may be to filter out signals broadcast by cards belonging to other users. The processed data associated with the signals may be sent from the mobile device 310 to the server 315. The server 315 may receive, from mobile device 310, the data associated with the signals detected by the first dynamic transaction card 320a. A memory of the server 315 may store one or more applications, such as a fraud detection application 335 and a database, such as a fraud profiles database 330. The fraud profiles database 330 may store a fraud profile for each of the dynamic transaction cards 320. The fraud detection application 335 may generate and/or update a fraud profile for the first dynamic transaction card 320a based on the data associated with signals detected by the first dynamic transaction card 320a during a periodic scan. If no fraud profile exists for the first dynamic transaction card 320a, the fraud detection application 335 may create a new fraud profile for the first dynamic transaction card 320a. The new fraud profile may include identifiers/profiles/etc. other transaction cards 320 and/or devices (e.g., mobile device 310), as decribed herein, proximately located near first transaction card 310a. If a fraud profile for the first dynamic transaction card 320a exists in the fraud profiles database 330, then the fraud detection application 335 may update the existing fraud profile. Otherwise, the fraud detection application 335 may generate a fraud profile for the first dynamic transaction card 320a and store it in the fraud profiles database 330.

The fraud profile for the first dynamic transaction card 320a may include an identification of the wireless communication-enabled cards and devices detected by the first dynamic transaction card 320a during periodic scans conducted over a period of time, such as the second dynamic transaction card 320b, the third dynamic transaction card 320c, and/or the mobile device 310. The fraud profile for the first dynamic transaction card 320a may also indicate a frequency with which each of the second dynamic transaction card 320b, the third dynamic transaction card 320c, and/or the mobile device 310 was detected over the period of time. As an example, the three dynamic transaction cards 320 may frequently be stored and carried in a wallet. Over a period of time, scans by the first dynamic transaction card 320a may frequently detect signals broadcast by the second transaction card 320b and/or third dynamic transaction card 320c in physical proximity to the first dynamic transaction card 320a. Thus, the fraud profile for the first dynamic transaction card 320a may comprise information for determining one or more wireless communication-enabled cards and/or devices that are normally nearby to the first dynamic transaction card 320a.

In some implementations, the fraud profile for the first dynamic transaction card 320a may also include information about one or more cards and/or devices that were detected by the first dynamic transaction card 320a during financial transactions conducted utilizing the first dynamic transaction card 320a. For example, the fraud profile may indicate that although the mobile device 310 was detected by the first dynamic transaction card 320a 50% of the time during periodic scans conducted by the first dynamic transaction card 320a, the mobile device 310 was detected by the first dynamic transaction card 320a 90% of the time during financial transactions conducted using the first dynamic transaction card 320a. In some implementations, the fraud detection application 335 may also periodically determine a current location of the mobile device 310 or a current location of the mobile device 310 relative to the cards 320 and record its location and corresponding time in the fraud profile of the first dynamic transaction card 320a. As discussed below, this location information may also be utilized for determining whether a financial transaction attempted using the first dynamic transaction card 320a is authorized or unauthorized.

The first dynamic transaction card 320a may be utilized as payment during a financial transaction attempted at the POS terminal 305. A memory of the POS terminal 305 may store one or more applications, such as a payment security application 345. Based on the POS terminal 305 detecting that the first dynamic transaction card 320 is inserted into the POS terminal 305, the payment security application 345 may cause the POS terminal 305 to initiate and/or establish a connection between the POS terminal 305 and the first dynamic transaction card 320a. Utilizing the established connection, the payment security application 345 may cause the first dynamic transaction card 320a to scan its environment for signals broadcast by one or more wireless communication-enabled devices in proximately located to the first dynamic transaction card 320a. The payment security application 345 may cause the first dynamic transaction card 320a to send data associated with the signals detected by the first dynamic transaction card 320a to the POS terminal 305. The data may include an identification (via the unique device identifiers) of the cards and/or devices associated with the signals. The payment security application 345 may cause the first dynamic transaction card 320a to send the data associated with the signals detected by the first dynamic transaction card 320a to the POS terminal 305. The POS terminal 305 may receive the data associated with the detected signals from the first dynamic transaction card 320a. The received data may be sent from the POS terminal 305 to the server 315.

The server 315 may receive the data associated with the signals detected by the first dynamic transaction card 320a during the attempted financial transaction. The fraud detection application 335 executing on the server 315 may retrieve the fraud profile of the first dynamic transaction card 320a from the fraud profiles database 330. The fraud detection application 335 may, based on the information in the fraud profile of the first dynamic transaction card 320a, determine a set of one or more cards and/or devices expected or anticipated to be detected by the first dynamic transaction card 320a proximately located to the first dynamic transaction card 320a during an attempted financial transaction utilizing the first dynamic transaction card 320a.

The set of one or more anticipated and/or expected cards and/or devices may be determined in various ways. The set of anticipated and/or expected cards or devices may be determined based on one or more of the cards and/or devices that were previously detected by the first dynamic transaction card 320a during periodic scans used to build the baseline fraud profile for first dynamic transaction card 320a. For example, if the baseline fraud profile indicates that the second and third dynamic transaction cards 320b and 320c were detected 50% of the time and/or the mobile device 310 was detected 10% of the time, then the set of anticipated and/or expected cards and/or devices may include the second dynamic transaction card 320b, the third dynamic transaction card 320c and/or the mobile device 310. As explained in greater detail below, the transaction may not be fraud if the identifiers for the second transaction card 320b and the third transaction card 320c were detected without the mobile device. Additionally or alternatively, the transaction may not deemed fraudulent if the identifiers for the second transaction card 320b and the mobile device 310 were detected without the third transaction card 320c. However, the transaction may be fraudulent if the identifier for the mobile device 310 is detected without the identifier of either the second transaction card 320b or the third transaction card 320c.

The set of anticipated cards and/or devices may also be determined based on a frequency with which the one or more cards or devices identified in the fraud profile were detected by the first dynamic transaction card 320a during periodic scans conducted over a period of time. For example, the fraud profile may indicate that, during periodic scans conducted over a period of time, the first dynamic transaction card 320a detected the second dynamic transaction card 320b 80% of the time, the third dynamic transaction card 320c 60% of the time, and the mobile device 45% of the time. A card and/or device identified in the fraud profile may be added to the set of anticipated cards and/or devices based on whether a frequency with which it was detected during periodic scans satisfies a threshold frequency. For example, if the threshold frequency is pre-set to be 50%, then the set of cards or devices anticipated and/or expected to be detected by the first dynamic transaction card 320a during an attempted financial transaction may include the second and third dynamic transaction cards 320b and 320c but not the mobile device 310.

The set of anticipated cards and/or devices may also be determined based on one or more cards and/or devices detected by the first dynamic transaction card 320a during previous financial transactions utilizing the first dynamic transaction card 320a. As discussed in more detail below, when a financial transaction utilizing the first dynamic transaction card 320a is attempted via the POS terminal 305, the POS terminal 305 may cause the first dynamic transaction card 320a to scan its environment and detect one or more cards and devices in proximately located to the first dynamic transaction card 320a. The attempted financial transaction may be determined to be authorized or unauthorized based on the cards and/or devices detected by the first dynamic transaction card 320a. If the attempted transaction is determined as authorized, then the authorized transaction may, along with the detected cards and/or devices, be recorded in the fraud profile of the first dynamic transaction card 320a. The anticipated cards and/or devices may also be selected from the cards and/or devices detected during authorized financial transactions based on a pre-set threshold frequency. If the threshold frequency for selecting a card and/or device detected during previously conducted financial transactions is pre-set to be 75%, and if the fraud profile indicates that the mobile device 310 was detected by the first dynamic transaction card 90% of the time during previous financial transactions, then the mobile device 310 may be included in the set of anticipated cards and/or devices to authorize the transaction. As indicated above, there may be many other ways for determining the set of anticipated cards and/or devices based on the information collected and recorded during periodic scans and previously conducted financial transactions.

The fraud detection application 335 may determine whether the financial transaction using the first dynamic transaction card 320a attempted at the POS terminal 305 is authorized or unauthorized. As an example, if the cards and/or devices detected by the first dynamic transaction card 320a during the currently attempted financial transaction comprise a subset of the set of cards and/or devices anticipated and/or expected to be detected by the first dynamic transaction card 320a during an attempted financial transaction, then the fraud detection application 335 may determine that the currently attempted financial transaction using the first dynamic transaction card 320a is authorized. Otherwise, the fraud detection application 335 may determine that the currently attempted financial transaction is unauthorized.

In some cases, a number of cards and/or devices comprising a "subset" may be a pre-set number. For example, if a "subset" is three cards and/or devices, then the currently attempted financial transaction may be determined as authorized, if the cards and/or devices detected during the currently attempted financial transaction include at least three of the cards and/or devices in the set of anticipated or expected cards or devices. As an example, the wallet including the three dynamic transaction cards 320 may be stolen by a thief and the first dynamic transaction card 320a may be then be presented by the thief as payment for a financial transaction attempted via the POS terminal 305. The POS terminal 305 may cause the first dynamic card 320a to scan its environment. If the thief has physical possession of the stolen wallet at the time of the attempted transaction, then when the first dynamic transaction card 320a scan its environment, it is likely to detect the second and third dynamic transaction cards 320b and 320c. However, since the thief did not steal the mobile device 310 and thus, would not have possession of the mobile device 310 at the time of the attempted financial transaction, the mobile phone 310 would not be detected by the first dynamic transaction card 320a. If the anticipated and/or expected set of cards and/or devices comprise the second and third dynamic transaction cards 320b and 320c and the mobile device 310 and the pre-set number of cards or devices comprising a "subset" is two, then the attempted transaction may be determined to be authorized. However, if the number of cards or devices in a "subset" is pre-set as three, then the attempted transaction may be determined to be unauthorized.

The fraud detection application 335 may also determine whether the attempted financial transaction is authorized or unauthorized based on a current location of the mobile phone 310, a current location of the POS terminal 305, and/or the previously recorded locations of the mobile device 310 in the fraud profile of the first dynamic transaction card 320a. Referring back to the example above, if the mobile device 310 is not detected by the first dynamic transaction card 320a during the attempted transaction, then the fraud detection application 335 may determine a time period between the most recently recorded location of the mobile phone 310 and the current time. The attempted financial transaction may be determined to be authorized if the time period satisfies a threshold amount of time. However, the attempted financial transaction may be determined to be unauthorized if the time period does not satisfy a threshold amount of time. The fraud detection application 335 may also determine whether the attempted financial transaction is unauthorized if the first dynamic transaction card 320a or any of the detected cards or devices have been reported as lost or stolen.

The fraud detection application 335 may generate an indication of whether the attempted financial transaction is authorized or unauthorized. The indication may be sent from the server 315 to the POS terminal 305. The payment security application 345 may determine whether to allow or block the attempted financial transaction based on the indication of whether the transaction is authorized or unauthorized. Based on an indication that the attempted financial transaction is authorized, the POS terminal 305 may allow the first dynamic transaction card 320a to be utilized as payment for the financial transaction. However, based on an indication that the attempted financial transaction is unauthorized, the POS terminal 305 may decline the first dynamic transaction card 320a as payment.

In some implementations, the fraud detection application 335 may generate a notification of an unauthorized attempted financial transaction for the card holder of the first dynamic transaction card 320a. The notification may be sent from the server 315 to the card holder, for example, to the mobile device 310. In some implementations, the owner of the first dynamic transaction card 320a may respond to the notification by authorizing the use of the first dynamic transaction card 320a, for example, via a mobile application (e.g., mobile application 325) on the user's mobile device (e.g., mobile device 310). The card holder's response and/or authorization may be sent to the server 315. Based on receiving the card holder's authorization, the fraud detection application 335 may generate an indication that the attempted financial transaction was authorized by the owner of the first dynamic transaction card 320a. The indication may be sent from the server 315 to the POS terminal 305. Based on receiving the card holder's authorization, the POS terminal 305 may accept the first dynamic transaction card 320a as payment for the financial transaction.

Turning to FIG. 3B, an example of a dynamic transaction card 301 is shown. In this regard, dynamic transaction card 301 may include a chip 360, charging port 365, memory 362, battery (not shown), and transceiver 360.

Memory 362 may be any type of media capable of storing data and information accessible by chip 360. Accordingly, memory 340 may include a hard-drive, a solid state drive, memory card, flash drive, ROM, RAM, or other optical disks, as well as other write-capable and read-only memories. Memory 362 may include short term or temporary storage as well as long term or persistent storage. In some embodiments, memory 362 may be integral to chip 360. Alternatively, memory 362 may be a circuit that is separate from chip 360.

Power supply 361 may be any suitable power source capable of providing power to transaction card 301. Power supply 361 may be a battery mounted on, or in, transaction card 301. Accordingly, power supply 361 may be a small, thin battery capable of being mounted on flexible circuit board between two substrate layers. In this regard, power supply 361 may be a rechargeable battery, such as a lithium-ion (Li-ion), lithium-ion polymer (Li-ion polymer), nickel-cadmium (NiCd), nickel-metal hydride (NiMH), or any equivalent thereof. In other instances, power supply 361 may be disposable battery capable of being replaced. In some embodiments, power supply 361 may include an inductive coil that allows power supply 361 to be recharged via electromagnetic induction. In further embodiments, power supply 361 may be one or more solar cells.

Transceiver 363 may be configured to exchange signals with a terminal, such as mobile device 310 and/or POS terminal 305, on behalf of transaction card 301. Transceiver 363 may include an antenna or any other communication capabilities, or any combination of hardware, software, and/or firmware that enable wireless communications. The wireless communications may include any suitable wireless communication protocol. In some examples, the wireless communication protocol may be a reduced power communication protocol, similar to Bluetooth Low Energy (BLE) or any other suitable reduced power (e.g., ~5 ma/transmission) communications protocol (e.g., BLE, NFC). By using a reduced power communication protocol, the power requirements of the transaction card may also be reduced. Transceiver 363 may be configured to permit transaction card 301 to communicate with the POS terminal 305 and/or mobile device 310. In other embodiments, transceiver 363 may comprise a short-range wireless transceiver configured to exchange signals with POS terminal 305 and/or mobile device 310.

Figure 4:
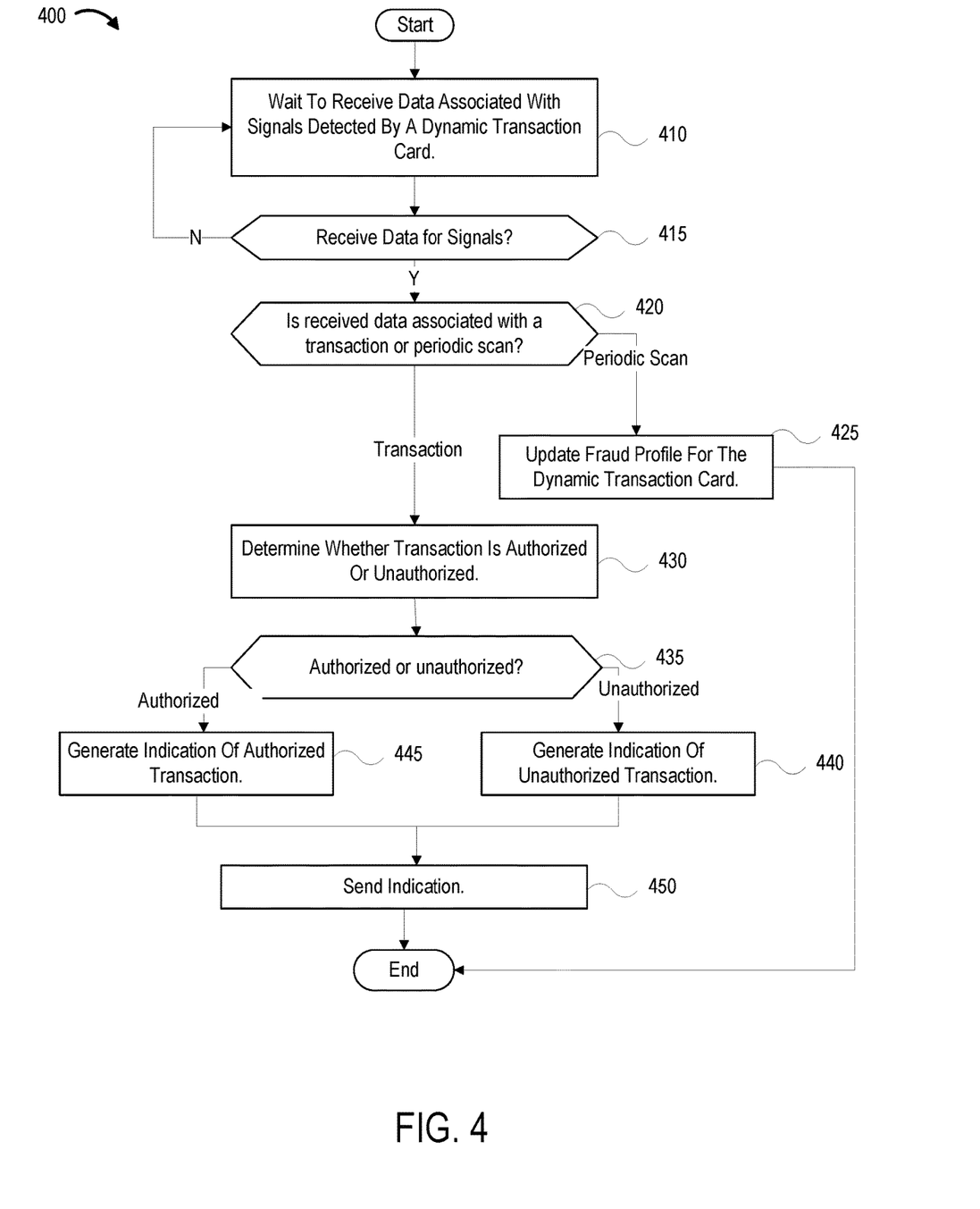
FIG. 4 shows a flow diagram of an example method for mitigating fraud via smart card local wireless communication.

FIG. 4 is a flow diagram of an example method 400 for mitigating fraud via wireless communication of dynamic transaction cards performed by a computing device (e.g. the fraud detection application 335 executing on the server 315, as shown in FIG. 3). Alternatively or additionally, some or all of the steps of the method 400 may be performed by one or more other computing devices. The steps of the method 400 may be modified, omitted, and/or performed in other orders, and/or other steps added.

At step 410, a computing device (e.g. the fraud detection application 335 executing on the server 315) may wait to receive data associated with signals detected by a dynamic transaction card during a scan of its environment. The signals may be broadcast by one or more cards 320 and/or mobile device 310 proximately located to the dynamic transaction card during the scan. The signals may be broadcast using any suitable wireless communication protocol. Preferably, the wireless communication protocol comprises a reduced power communication protocol, such as BLE, NFC, and/or an equivalent thereof.

At step 415, a computing device (e.g. the fraud detection application 335 executing on the server 315), may evaluate whether data associated with signals detected by a dynamic transaction card has been received by the server 315. If data associated with signals detected by a dynamic transaction card has not been received by the server 315, then the process 400 returns to step 410. However, at step 415, if data associated with signals detected by a dynamic transaction card, such as the first dynamic transaction card 320a, has been received by the server 315, then the process 400 proceeds to step 420.

At step 420, a computing device (e.g. the fraud detection application 335 executing on the server 315) may evaluate whether the received data is associated with a periodic scan by the first dynamic transaction card 320a and/or a financial transaction attempted using the first dynamic transaction card 320a. As discussed above, the mobile application 325 may cause the first dynamic transaction card 320a to scan its environment and detect signals that are being broadcast by one or more wireless communication-enabled cards and/or devices in proximately located to the first dynamic transaction card 320a, such as the second and third dynamic transaction cards 320b and 320c and/or the mobile device 310. If the received data is associated with a periodic scan by the first dynamic transaction card 320a, then the process proceeds to step 425, and the computing device (e.g. the fraud detection application 335 executing on the server 315) may generate or update a fraud profile of the first dynamic transaction card 320a based on the received data associated with the periodic scan.

However, at step 420, if the received data is associated with signals detected by the first dynamic transaction card 320a during an attempted financial transaction, then the process proceeds to step 430. At step 430, a computing device (e.g. the fraud detection application 335 executing on the server 315) may determine, based on the received data associated with the signals detected during an attempted financial transaction using the first dynamic transaction card 320a, whether the attempted financial transaction is authorized or unauthorized. The fraud detection application 335 may retrieve the fraud profile for the first dynamic transaction card 320a from the fraud profiles database 330. The fraud detection application 335 may, based on the information in the fraud profile for the first dynamic transaction card 320a, determine a set of one or more cards and/or devices expected and/or anticipated to be detected in proximately located to the first dynamic transaction card 320a during an attempted financial transaction utilizing the first dynamic transaction card 320a. If the cards and/or devices detected by the first dynamic transaction card 320a comprise all, or a subset, of the set of cards and/or devices anticipated and/or expected to be detected by the first dynamic transaction card 320a during an attempted financial transaction, then the fraud detection application 335 may determine that the currently attempted financial transaction using the first dynamic transaction card 320a is authorized. Otherwise, the fraud detection application 335 may determine that the currently attempted financial transaction using the first dynamic transaction card 320a is unauthorized.

At step 435, a computing device (e.g. the fraud detection application 335 executing on the server 315) may evaluate whether the attempted financial transaction was determined to be authorized or unauthorized. If the attempted financial transaction was determined to be authorized, then the process 400 proceeds to step 445. At step 445, a computing device (e.g. the fraud detection application 335 executing on the server 315) may generate an indication that the attempted financial transaction is authorized. However, at step 435, if the attempted financial transaction is unauthorized, then the process 400 proceeds to step 440. At step 440, a computing device (e.g. the fraud detection application 335 executing on the server 315) may generate an indication that the attempted financial transaction is unauthorized. At step 450, a computing device (e.g. the fraud detection application 335 executing on the server 315) may send the indication of whether the attempted financial transaction is authorized or unauthorized to the POS terminal 305. The POS terminal receives the indication. For an authorized transaction, the sale is completed. For unauthorized transactions the transaction is declined.

The method and systems described herein provide increased fraud mitigation for dynamic transaction cards by ensuring that the cards and devices normally present nearby or in physical proximity to a dynamic transaction card are also present nearby or in physical proximity to the card when the card is used to conduct a financial transaction.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
    detecting, by a dynamic transaction card, a first plurality of signals broadcast by one or more first devices in physical proximity to the dynamic transaction card, wherein the dynamic transaction card comprises a short-range wireless communication-enabled card and the wireless communication comprises a short-range wireless communication protocol, and wherein the one or more first devices comprise at least one of a different dynamic transaction card or a mobile device associated with an owner of the dynamic transaction card;
    receiving, by a server and at regular time intervals, data associated with the first plurality of signals;
    determining, by the server and based on the received data associated with the first plurality of signals, one or more of the first devices that are expected to be detected by the dynamic transaction card while attempting a financial transaction via a point-of-sale (POS) terminal;
    detecting, by the dynamic transaction card, a second plurality of signals in association with an attempted financial transaction conducted via a point-of-sale (POS) terminal, wherein the second plurality of signals are broadcast by one or more second devices in physical proximity to the dynamic transaction card during the attempted financial transaction;
    receiving, by the server, data associated with the second plurality of signals;
    determining, by the server and based on the received data associated with the second plurality of signals, whether the one or more second devices comprise a subset of the one or more of the first devices that are expected to be detected by the dynamic transaction card while attempting an authorized financial transaction via the point-of-sale (POS) terminal;
    generating, by the server and based on determining that the one or more second devices do not comprise a subset of the one or more of the first devices that are expected to be detected by the dynamic transaction card while attempting a financial transaction, an indication that the attempted financial transaction is unauthorized; and
    sending, by the server and to the POS terminal, an indication that the attempted financial transaction is unauthorized.

2. The computer-implemented method of claim 1, wherein determining the one or more of the first devices that are expected to be detected by the dynamic transaction card while attempting an authorized financial transaction comprises:
    determining, over a period of time, a frequency with which each of the one or more first devices has been detected by the dynamic transaction card in physical proximity to the dynamic transaction card.

3. The computer-implemented method of claim 1, wherein determining that the attempted financial transaction is unauthorized comprises:
    determining, based on a frequency with which each of the one or more second devices has been detected previously by the dynamic transaction card in physical proximity, a likelihood that the attempted financial transaction is unauthorized; and
    determining, based on the likelihood satisfying a threshold, that the attempted financial transaction is unauthorized.

4. The computer-implemented method of claim 1, wherein the attempted financial transaction is blocked based on a determination that the attempted financial transaction is unauthorized.

5. The computer-implemented method of claim 1, wherein the server deactivates the dynamic transaction card, based on determining that the attempted financial transaction is unauthorized, to prevent future use of the dynamic transaction card.

6. The computer-implemented method of claim 1 comprising:
    notifying the owner of the dynamic transaction card of an unauthorized attempted financial transaction.

7. The computer-implemented method of claim 6 comprising:
    receiving, by the server and from the owner of the dynamic transaction card, an authorization of the attempted financial transaction in response to notifying the owner of the unauthorized attempted financial transaction.

8. The computer-implemented method of claim 1, wherein the data associated with the first plurality of signals detected by the dynamic transaction card comprise an identification of each of the one or more first devices, and the data associated with the second plurality of signals detected by the dynamic transaction card comprise an identification of each of the one or more second devices.

9. A system, comprising:
    a dynamic transaction card, wherein the dynamic transaction card comprises a short-range wireless communication-enabled card and the wireless communication comprises a short-range wireless communication protocol, wherein the dynamic transaction card is configured to:
        detect a first plurality of signals broadcast by one or more first devices in physical proximity to the dynamic transaction card, wherein the one or more first devices comprise at least one of a different dynamic transaction card or a mobile device associated with an owner of the dynamic transaction card; and
        detect a second plurality of signals in association with an attempted financial transaction conducted via a point-of-sale (POS) terminal, wherein the second plurality of signals are broadcast by one or more second devices in physical proximity to the dynamic transaction card during the attempted financial transaction; and
    a server comprising:
        one or more processors; and
        memory storing instructions that, when executed by the one or more processors, cause the server to:
            receive, periodically, data associated with the first plurality of signals;
            determine, based on the received data associated with the first plurality of signals, one or more devices anticipated to be detected by the dynamic transaction card in physical proximity to the dynamic transaction card at an authorized financial transaction;

receive data associated with the second plurality of signals;

determine, based on the received data associated with the second plurality of signals, whether the one or more second devices comprise a subset of the one or more devices anticipated to be detected by the dynamic transaction card in physical proximity to the dynamic transaction card during an authorized financial transaction;

generate, based on determining that the one or more second devices do not comprise a subset of the one or more devices anticipated to be detected by the dynamic transaction card in physical proximity to the dynamic transaction card during an authorized financial transaction, an indication that the attempted financial transaction is unauthorized; and send, for delivery to the POS terminal, the indication that the attempted financial transaction is unauthorized.

10. The system of claim 9, wherein the attempted financial transaction is declined based on a determination that the attempted financial transaction is unauthorized.

11. The system of claim 9, wherein the instructions, when executed by the one or more processors, cause the system to:

lock the dynamic transaction card, based on determining that the attempted financial transaction is unauthorized, to prevent a future use of the dynamic transaction card.

12. The system of claim 9, wherein the instructions, when executed by the one or more processors, cause the system to:

notify an owner of the dynamic transaction card that the attempted financial transaction is unauthorized.

13. The system of claim 12, wherein the instructions, when executed by the one or more processors, cause the system to:

receive, in response to notifying the owner of the dynamic transaction card that the attempted financial transaction is unauthorized, authorization from the owner for the attempted financial transaction.

14. A non-transitory machine-readable medium storing instructions that, when executed by one or more processors, cause the one or more processors to perform steps comprising:

detecting, by a dynamic transaction card, a first plurality of signals broadcast by one or more first devices in physical proximity to the dynamic transaction card, wherein the dynamic transaction card comprises a short-range wireless communication-enabled card and the wireless communication comprises a short-range wireless communication protocol, and wherein the one or more first devices comprise at least one of a different dynamic transaction card or a mobile device associated with an owner of the dynamic transaction card;

receiving, periodically, data associated with the first plurality of signals detected by a dynamic transaction card;

determining, based on the received data associated with the first plurality of signals, one or more approved devices expected to be detected by the dynamic transaction card in physical proximity to the dynamic transaction card when conducting a authorized financial transaction;

detecting, by the dynamic transaction card, a second plurality of signals in association with an attempted financial transaction conducted via a point-of-sale (POS) terminal, wherein the second plurality of signals are broadcast by one or more second devices in physical proximity to the dynamic transaction card during the attempted financial transaction;

receiving, data associated with the second plurality of signals;

determining, based on the received data associated with the second plurality of signals, whether the one or more second devices comprise a subset of the one or more approved devices;

generating, based on determining that the one or more second devices do not comprise a subset of the one or more approved devices, an indication that the attempted financial transaction is unauthorized, wherein the attempted financial transaction is blocked based on a determination that the attempted financial transaction is unauthorized;

locking the dynamic transaction card, based on determining that the attempted financial transaction is unauthorized, to prevent a future use of the dynamic transaction card;

notifying the owner of the dynamic transaction card that the attempted financial transaction is unauthorized; and sending, for delivery to the POS terminal, the indication that the attempted financial transaction is unauthorized.

* * * * *